United States Patent [19]

Becker

[11] Patent Number: 5,236,731

[45] Date of Patent: Aug. 17, 1993

[54] PROCESS FOR THE MANUFACTURE OF SLICEABLE, CASING-FREE SAUSAGE

[75] Inventor: Heinz Becker, Hamburg, Fed. Rep. of Germany

[73] Assignee: World Food Machinery America Corporation, New York, N.Y.

[21] Appl. No.: 813,220

[22] Filed: Dec. 23, 1991

[51] Int. Cl.$^5$ ............................................. A22C 11/00
[52] U.S. Cl. ..................................... 426/513; 426/518
[58] Field of Search ............... 426/513, 516, 523, 518, 426/243

[56] References Cited

U.S. PATENT DOCUMENTS 4,294,858 10/1981 Moule ................................. 426/513
4,800,094 1/1989 Freda et al. ......................... 426/513

*Primary Examiner*—George Yeung
*Attorney, Agent, or Firm*—Townsend and Townsend Khourie and Crew

[57] ABSTRACT

The invention concerns a process for the manufacture of a sliceable, casing-free sausage, in which first a rigid, inflexible jacket is filled with sausage mixture, the jacket is closed at its first and second ends, and then heated, preferably in steam-heated air or hot water, thus coagulating the sausage mixture, and the jacket is thereafter cooled. The closed jacket is opened at one end and applied to a slicing machine, whereupon the finished sausage located in the jacket is pushed forward out of the jacket through its now-open end, and is cut in slices at this end. Moreover, the invention concerns a mechanism to carry out this process. Thanks to the invention there is no unsalable outside piece of the sausage at the ends, and no casing has to be removed before slicing. The elimination of the need for casing saves the costs associated with the manufacture and disposal of casing.

7 Claims, 5 Drawing Sheets

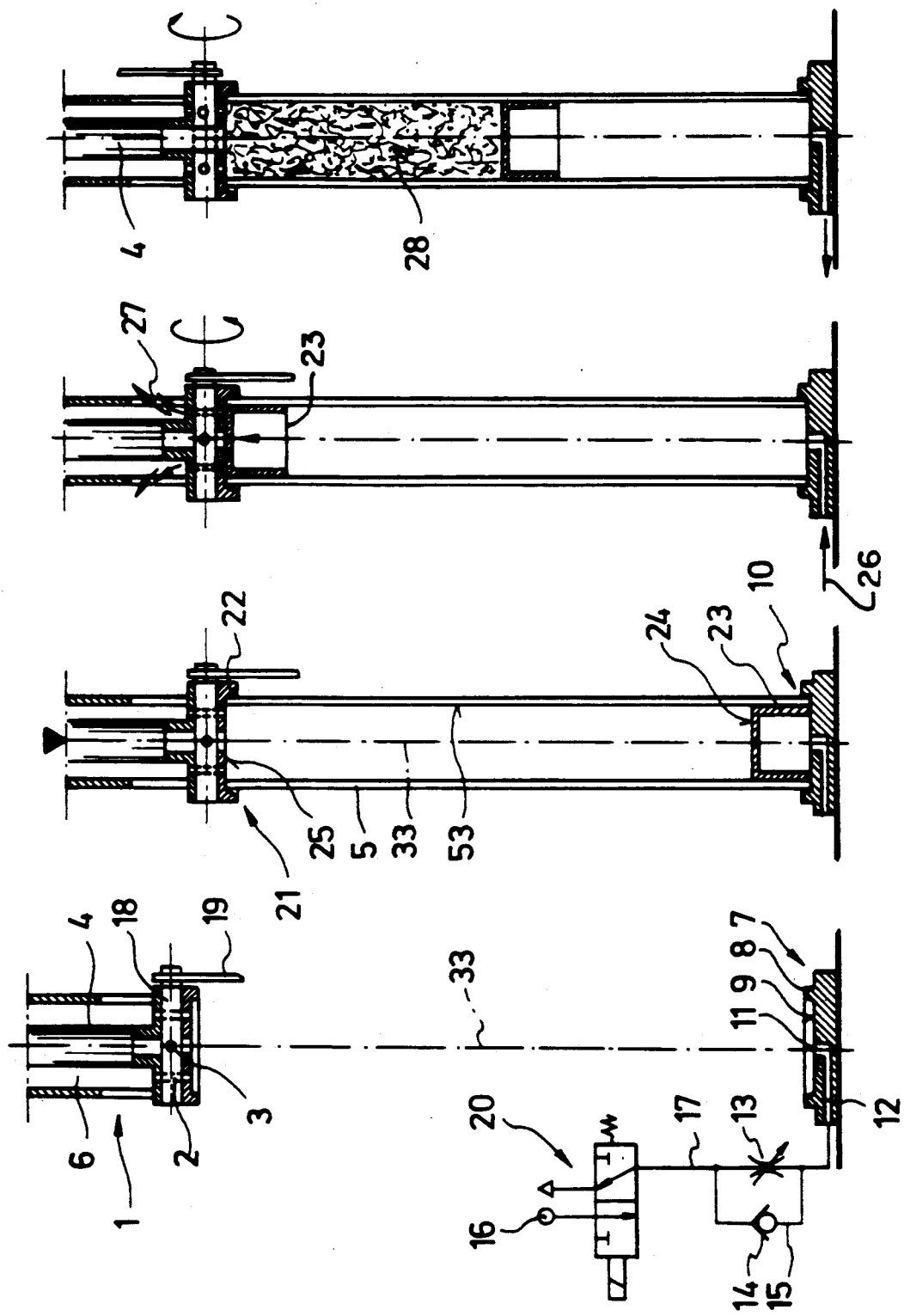

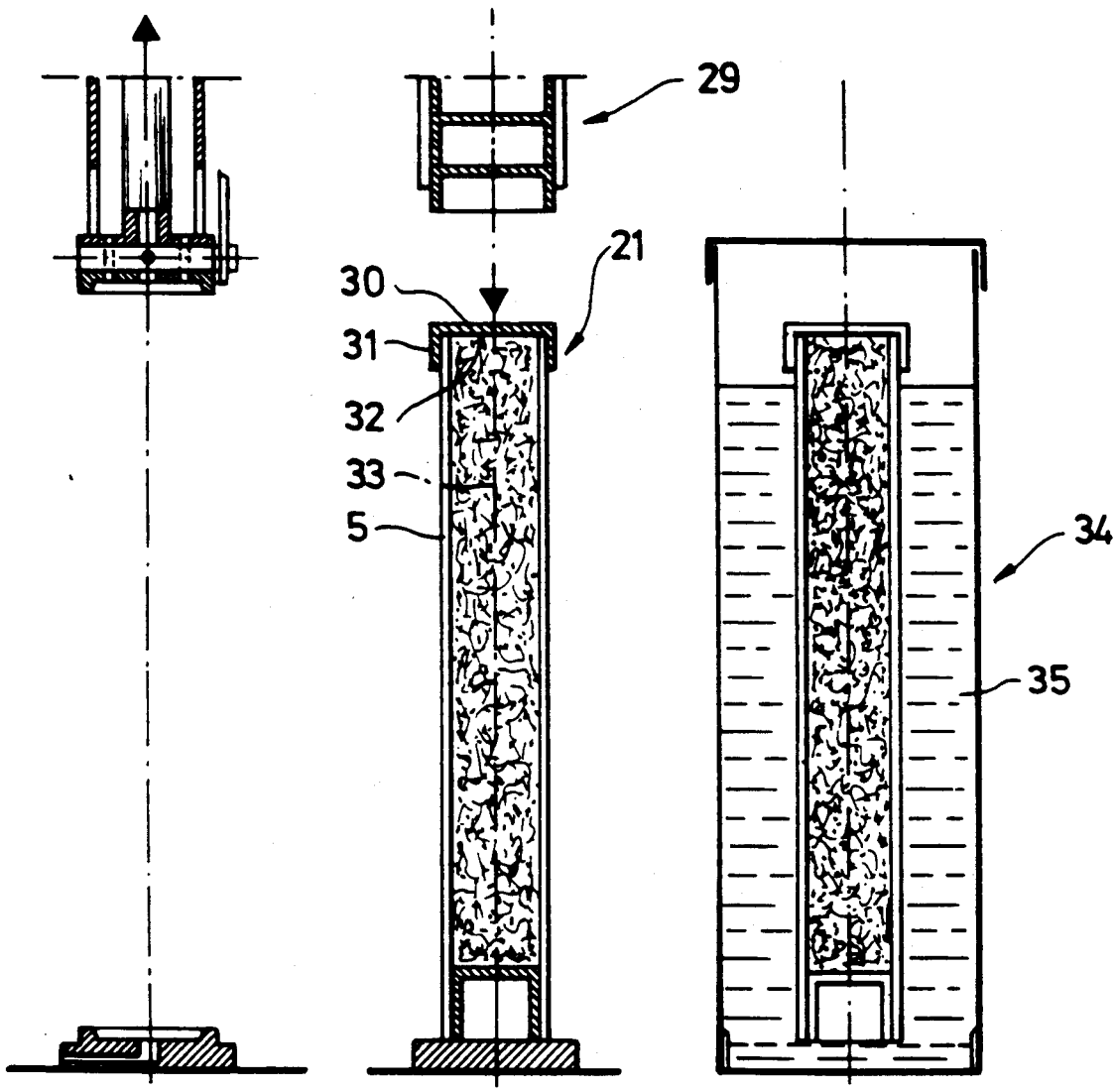
FIG. IE.  FIG. IF.  FIG. IG.

PROCESS FOR THE MANUFACTURE OF SLICEABLE, CASING-FREE SAUSAGE

The invention concerns a process for the manufacture of a sliceable, casing-free sausage, in which first a rigid, inflexible jacket is filled with sausage mixture, the jacket is closed at its first and second ends, and then heated, preferably in hot water, thus coagulating the sausage mixture, and the jacket is thereafter cooled; as well as a mechanism to carry out this process.

BACKGROUND OF THE INVENTION

In conventional sausage production, the so-called sausage mixture, a protein-water-fat emulsion, is pressed into a flexible casing tied together at one end, which for example may be made of natural intestine, but also of plastic film. After the sausage mixture is placed inside, this casing was also closed at its other end, and the sausage was first "reddened" and then cooked, in which process the sausage mixture coagulated. Before slicing the sausages the casings are peeled off by hand, which is labor intensive and thus expensive. Another problem is that, due to the tying-off the casing, the ends of the sausages are rounded, leaving an outside piece that has not been saleable. The additional effort caused by the casing is disadvantageous particularly in the course of mass production of pre-sliced and then preserved sausage, for example of sausage packed in clear packages, since unnecessary costs result because in this case the casing has no other function than for sausage production, and had to be removed from the slices before they were packaged ready for sale.

From German Offenlegungsschrift 25 23 506, a machine is known for the manufacture of small, casing-free sausages, in which small sausages not suitable for slicing, with round ends, are produced in metal jackets, and a plurality of such jackets are combined into a conveyor chain. This permits the subsequent removal of the casings to be avoided, but even assuming a larger diameter these small sausages are as already mentioned not suitable for slicing, since they likewise have a round end that yields an unsalable outside piece.

SUMMARY OF THE INVENTION

The invention accomplishes the task of creating a process and a mechanism of the type stated at the outset, for the manufacture of sliceable sausage with a large diameter, eliminating the removal of a sausage casing and an unsalable outside piece of the sausage.

This task is accomplished under the invention in that the closed jacket is opened at one end and applied to a slicing machine, whereupon the finished sausage located in the jacket is pushed forward out of the jacket through its now-open end, and is cut in slices at this end.

For this purpose, under the invention, an installation is used which is provided with a jacket of rigid material and a piston that can be longitudinally displaced along the inside of the jacket, which piston seals the jacket at its second end in the state filled with sausage mixture; with a filling valve head and filling base, between which the jacket is mounted to be filled with sausage mixture; with a closing station at which the jacket in its filled state can be closed with a cover on its first end; with a heating station so structured that the filled jacket can be heated in such a way that the sausage mixture coagulates into a sausage; and with a cutting mechanism with fasteners in order to attach the jacket, the cutting mechanism being provided with a cutting blade located at the first end of the jacket and a feed mechanism located at the second end of the jacket, which latter mechanism can be engaged with the piston.

The process under the invention and the corresponding mechanism under the invention offer the advantage that in the manufacture of sliced sausage the expense of manufacturing the casing is eliminated and there is no casing which must be removed before or after slicing. This saves, on the one hand, the expense of manufacturing the casing and, on the other hand, the expense of removing the casing. Furthermore, it avoids the development of waste in the form of synthetic casings used only one time.

The jackets under the invention are reusable after the sausage has been pushed out and sliced. Before reuse, they may if applicable be cleaned, which for example may take place in dishwasher-like cleaning mechanisms.

The sausage may also be delivered to the retailer in the jacket under the invention, which for example may be made of metal or plastic. The retailer can then directly slice up the sausage on the spot, out of the jacket, and return the jacket to the sausage factory, for example as a jacket secured by a deposit. However, it is also possible to use a disposable jacket, which is discarded by the butcher after slicing.

The process under the invention is particularly advantageous, however, in the direct manufacture of sliced sausage, i.e., the sliced sausage is divided into portions and packaged directly as sausage slices ready for sale, which can be done directly in the sausage factory. The sliced sausage may for example be sealed in clear plastic film as a package for sale to the intermediate dealer and end user. Here the jacket under the invention is not used at all as a package for sale. In other words, in contrast to the previously described possible application of the process under the invention, the jacket does not leave the sausage factory. In the direct manufacture of sliced sausage, a conventional sausage casing is provided only for purposes of production, and in no way serves as a package for sale. Hence the process under the invention can save the production costs associated with conventional flexible casings, which involve both the manufacture of the casing and the removal of the casing before or after slicing of the sausage.

Another substantial economic advantage can be achieved by closing the two ends of the sausage, with flat closures perpendicular to a longitudinal axis of the jacket, in such a way that the sausage inside the jacket has a cylindrical shape with an end face perpendicular to the longitudinal axis of the jacket. In the installation under the invention, for this purpose the piston and cover advantageously have flat closing surfaces which are disposed perpendicularly to one longitudinal axis of the jacket. The particular economic advantage can be seen in the fact that with the sausage under the invention, the outside piece, which yields sausage slices of smaller diameter and a tip, is eliminated.

In conventional sausages the sausage tip and smaller-diameter sausage slices result from the tying-off of the flexible casing at the ends of the sausage. The smaller-diameter sausage slices result from the casing tied off at its ends, due to which conventional sausage ends have a more or less round shape. The outside piece from conventional sausages frequently cannot be sold, and entails a poorer utilization, which can be avoided in accordance with the advantageous further development of the invention mentioned above, which leads to flat sausage ends.

However, it is also possible in principle to provide the shape of the piston and cover in such a way that flat outside-piece surfaces, i.e., the end faces of the jacket, result at one or both ends of the sausage, in such a way that these form an angle other than 90° with the longitudinal axis of the jacket, and the two oblique end faces of the jacket are parallel to one another. In this way, with an oblique positioning of the jacket relative to the cutting blade, one likewise avoids an unsalable outside piece, and even at smaller diameters of the jacket one can produce larger-size sausage slices in an elongated, oval shape.

Although it is possible to push the sausage out of the jacket for its entire length prior to slicing, under an advantageous further development of the process under the invention the sausage is slowly pushed out of the jacket, through its open end, in the direction of a cutting blade, and after a short length relative to the jacket length has been pushed out, the sausage is conveyed directly to the cutting blade and sliced.

For this purpose, advantageously the fasteners to attach the jacket are disposed at such a distance from the cutting blade that in the fastened position of the jacket the first end of the jacket is in the immediate vicinity of the cutting blade, so that the sausage upon exiting from the jacket can be sliced at its first end, after only a short exiting length, which corresponds to a fraction of the full length of the jacket and thus of the sausage. Here it is also possible to attach the jacket by manual holding on the cutting machine. In this case the fasteners may consist of simple stops, against which the jacket is held by hand, in order to guarantee suitable positioning.

The cutting blade may be a rotating sausage-slicing blade as usually used for slicing sausage and which moves back and forth. However, a non-rotating blade moving back and forth or up and down may also be used if the sausage is suitable to be sliced up by means of such a blade. The jacket may be moved relative to the blade and the blade may also be moved relative to the jacket.

Preferably, the filling valve head is provided with a sausage-mixture filling valve and an air-evacuation valve, in which case the sausage-mixture filling valve and the air-evacuation valve have a combination tap plug rotatably mounted in the housing of a tap, in which case a radial sausage-mixture filling hole and a radial air-evacuation hole are disposed in the tap plug, offset from one another in the axial direction of the tap plug and running perpendicular to one another, in which case the air-evacuation hole and the sausage-mixture filling hole of the tap plug can be connected, on the one hand to a hole opening into the interior of the jacket and on the other hand to the air-evacuation line or respectively a sausage-mixture feed line, depending on the angular position of the tap plug. Here the filling base is advantageously provided with a centering edge, which borders a receiving surface for the jacket, which surface seals the end face of the jacket on its second end when the jacket is fixed in the filling station, in which case an opening is provided in the jacket receiving surface which leads to the outside by way of a receiving surface connecting line. In accordance with an advantageous further development of these configurations, an air-evacuation pump is connected to the air-evacuation valve, through which the piston can be conveyed from the second end of the jacket to its first end by drawing out the air between the piston and the first end of the jacket. With this advantageous further configuration of the invention, in the manufacture of the sausage, before the jacket is filled with sausage mixture a piston that can be displaced longitudinally inside the jacket is conveyed from a second end of the jacket to its first end by evacuating air located in the jacket between the piston and a first end of the jacket, and the piston is pressed back from the first end of the jacket to its second end by filling the jacket with sausage mixture, in which case in the completely filled state of the jacket the piston reaches the second end of the jacket.

In this way, for example by generating a vacuum in the jacket, the piston can easily be moved to its initial filling position, without having to provide a mechanism more vulnerable to failure that would displace the piston directly. However, as a matter of fundamental principle a displacement of the piston with a mechanism is also possible.

In accordance with another advantageous further development of the invention, the receiving surface connection line is connected via a check valve and control valves to a compressed-air supply line, in which case the check valve opens when compressed air is applied and the piston can be conveyed by the application of compressed air from the second end of the jacket to its first end and held in this position. In this case, a throttling port can advantageously be connected in parallel to the check valve, and the piston can be movable by pressing the sausage mixture into the jacket from the first end of the jacket to the second end, displacing through the throttling port the air located between the piston and the second end of the jacket.

According to this further development of the invention, under the invention, before the jacket is filled with sausage mixture a piston longitudinally movable inside the jacket is conveyed by unilateral application of air pressure from the second end of the jacket to its first end by means of compressed air introduced into a space between the piston and a second end of the jacket, and by filling the jacket with sausage mixture the piston is pressed back from the first end of the jacket to its second end against an air-displacement resistance of the piston, in which case in the completely filled state of the jacket the piston reaches the second end.

This yields the advantage that one can dispense with a vacuum pump, and the piston can be moved to its initial filling position by way of compressed air. As a compressed-air source, the compressed-air network which as a rule is present anyhow in factories may be used. The displacement of air out of the jacket on the underside of the piston and through the throttling port ensures that during the filling process the piston is moved by the sausage mixture against a resistance predetermined by the design of the throttling port, thus yielding a more uniform filling. The check valve disposed in a bypass line to the throttling port ensures that bypassing the throttling port, compressed air can be introduced into the jacket with low resistance, in order to be able to move the piston quickly into its initial filling position.

According to an advantageous further development of the invention, the advance of the sausage out of the jacket and into the cutting machine takes place in that the piston is moved along the interior of the jacket from its second end to its first end, which is now open. Here a feed mechanism can advantageously be used in which the feed mechanism is a threaded spindle driven by an electric motor, whose one end is so disposed that in the state in which the jacket is fixed to the cutting mechanism, it can be engaged with the piston to displace same from the second end of the jacket in the direction of the first end of the jacket. However, any other desired feed mechanism is possible, for example a pneumatic or hydraulic feed mechanism or a toothed-gear and toothed-rack pairing. The feed can also proceed step by step, with the sausage being pushed out of the jacket only by the thickness of one slice at each feed step. Such a feed type is suitable in the case of a rotating or non-rotating blade moving back and forth.

BRIEF DESCRIPTION OF THE DRAWINGS

The invention is described below using preferred exemplary embodiments with reference to the drawing. In the drawing, FIGS. 1A-1G are a cartoon sequence illustrating the operation of the invention in which:

FIG. 1A illustrates the placement of the heads at opposite ends of the sausage apparatus before placement of the casing of this invention;

FIG. 1B illustrates placement of the casing apparatus with insertion of a traveling piston for packing of the sausage casing;

FIG. 1C illustrates the traveling piston within the casing in the upward position just prior to the receipt of sausage material;

FIG. 1D illustrates the partial injection of sausage material into the cylinder;

FIG. 1E illustrates the respective heads after removal of the filled casing;

FIG. 1F illustrates the casing being capped at the upper end and having the moving piston closing the lower end;

FIG. 1G illustrates cooking and cooling of the sausage in the reusable casing;

DESCRIPTION OF THE PREFERRED EMBODIMENT

Figure 2:
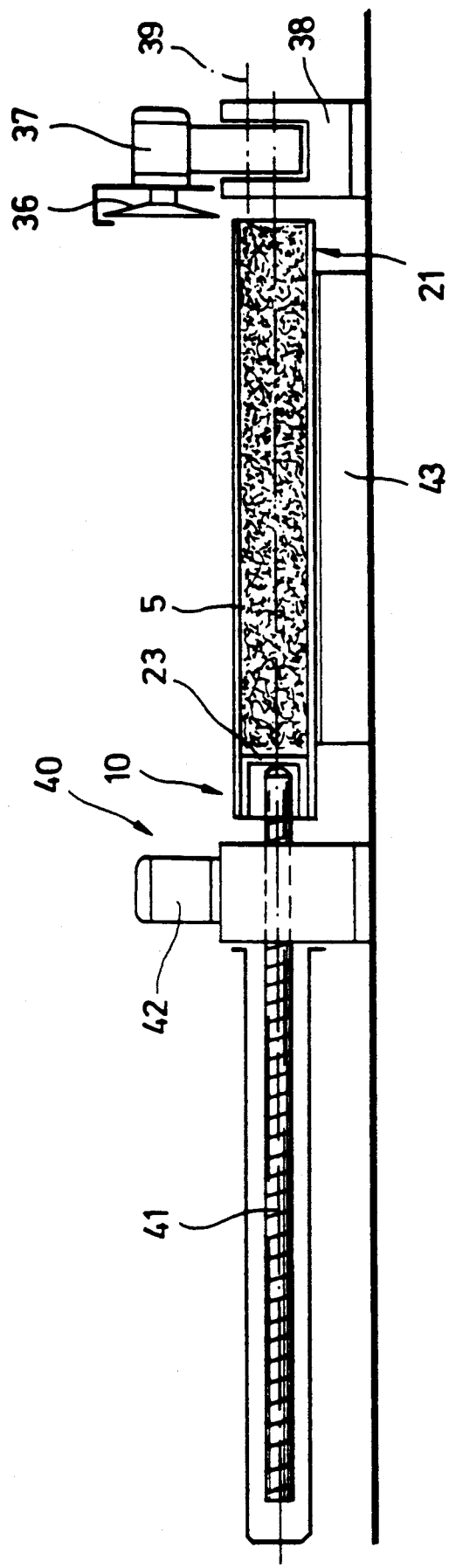
FIG. 2 illustrates fully cooked sausage being ejected from the casing with the already squared ends being sliced at a sausage slicer.
Figure 3:
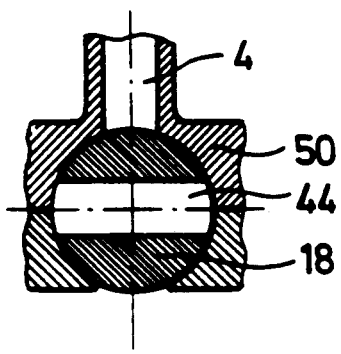
FIG. 3 is a detail of a plug type valve utilized in the upper head construction of the invention along lines A-B of FIG. 4.

FIG. 1A shows the filling mechanism without the jacket 5 inserted. The filling mechanism has a valve head 1, which is equipped with an air-evacuation valve 2 and a filling valve 3, both of which will be explained in more detail below in connection with FIG. 5 and FIG. 6. The filling valve 3 is connected to a filling line 4 to fill the jacket 5 with sausage mixture, which represents a paste-like protein-water-fat emulsion. The air-evacuation valve 2 is connected to an annular air-evacuation channel, through which air can be released to the outside. The air-evacuation valve 2 and the filling valve 3 have a shared tap plug 18, which can be rotated by means of a lever 19 mounted to enable rotation. Depending on the position of the lever 19 and thus of the tap plug 18, either the air-evacuation valve 2 is open and the filling valve 3 is at the same time closed, or the filling valve 3 is open and the air-evacuation valve 2 is at the same time closed.

The installation furthermore has a filling base 7, provided with a centering edge 8 which borders a jacket receiving surface 9. In the inserted state of the jacket 5, as can also be seen from the representations in FIGS. 1B-1D, FIGS. 1F and 1G and FIGS. 5 and 6, when the jacket 5 is fixed in the filling station the jacket receiving surface 9 closes the jacket's end face on its second end 10. The jacket receiving surface 9 is equipped with an opening 11 which leads to the outside by way of a receiving surface connection line 12. To the receiving surface connection line 12, a compressed-air source (not shown) is connected by way of a throttling port 13 (shown schematically) and a check valve 14. The throttling port 13 and the check valve 14 are disposed in parallel to one another, i.e., the check valve 14 is disposed in a bypass channel 15 to the throttling port 13. The compressed-air source supplies compressed air by way of a compressed-air line 16 (shown schematically), which can be connected by way of a pilot valve 20 to a feed and drain line 17, which in turn leads to the throttling port 13 and check valve 14, elements which are connected in parallel, and which in turn are both connected to the receiving surface connection line 12.

In the inserted state of the jacket 5, as can be seen from the representations in FIGS. 1B-1D, FIGS. 1F and 1G and FIGS. 5 and 6, the first end 21 of the jacket 5 is set in a centering edge 22 of the valve head 1, and is closed by this latter, while the second end 10 of the jacket 5 is inserted in the centering edge 8 of the filling base 7 and is closed by this latter.

In the jacket 5, a piston 23 is disposed, which can be displaced along the jacket 5. The piston 23 is sealed against the cylindrical inner wall 53 of the jacket 5, with sealing devices not shown in FIGS. 1A-1G to 2, and can be displaced maintaining this sealed contact against the inner wall 53. See FIG. 4. If, as is shown in FIG. 1B, the unfilled jacket 5 is inserted between the valve head 1 and the filling base 7, the piston 23 is located at the second end 10 of the jacket 5. For reasons of better guidance, the piston 23 has a sufficient extension in the longitudinal direction of the jacket 5. For reasons of better utilization of a feed mechanism, explained further below, and for reasons of saving materials and better manufacturing feasibility, the piston 23 is hollow on its side facing away from the second end 10, while for a straight and flat closure of the jacket the piston is equipped with a closing surface 24 perpendicular to the longitudinal axis 33 of the jacket 5, which surface extends flat and perpendicularly to the longitudinal axis 33 of the jacket. This is important in order for the subsequently produced sausage to have a corresponding end face that runs perpendicularly to the longitudinal axis of the sausage and is flat.

Correspondingly, a closure surface 25 of the valve head 1 at the first end 21 of the jacket 5 is configured in such a way that it runs flat and perpendicularly to the longitudinal axis 33 of the jacket 5. In the state shown in FIGS. 1B, 1C and 1D, as well as FIG. 5, the jacket 5 is firmly clamped by a pressing mechanism (not shown) between the valve head 1 and the filling base 7, so that between the jacket 5 and the valve head 1 and the filling base 7, a sealed contact results, so that on the one hand no compressed air can escape between the jacket 5 and the filling base 7, and on the other hand no sausage mixture 28 can escape between the jacket 5 and the valve head 1 during the filling process.

In the state shown in FIG. 1B, the lever 19 and thus the tap plug 18 assume a position such that the air-evacuation valve 2 is open to the outside by way of the annular space 6, and thus creates a connection outward between the interior space in the jacket 5, located between the piston 23 and the second end 21 of the jacket 5, and the outside environment. Hence air can escape from the interior space of the jacket 5 into the annular space, as is shown symbolically by the arrows 27 in FIG. 1C. The annular space 6 is open to the environment.

In this state the pilot valve 20 is activated in such a way that the compressed-air line 16 is connected via the feed and drain lines 17, the bypass channel 15 with the check valve 14 as well as the throttling port 13 connected parallel thereto, to the receiving surface connection line 12, through which compressed air is conveyed into the interior space of the jacket 5, between its second end 10 and the piston 23, as shown by the arrow 26 in FIG. 1C. In this process, the check valve 14 opens and the compressed air can flow relatively unhindered into the aforementioned interior space of the jacket 5. In this process a comparatively insignificantly small amount of compressed air also flows through the throttling port 13 into the interior of the jacket 5.

Figure 5:
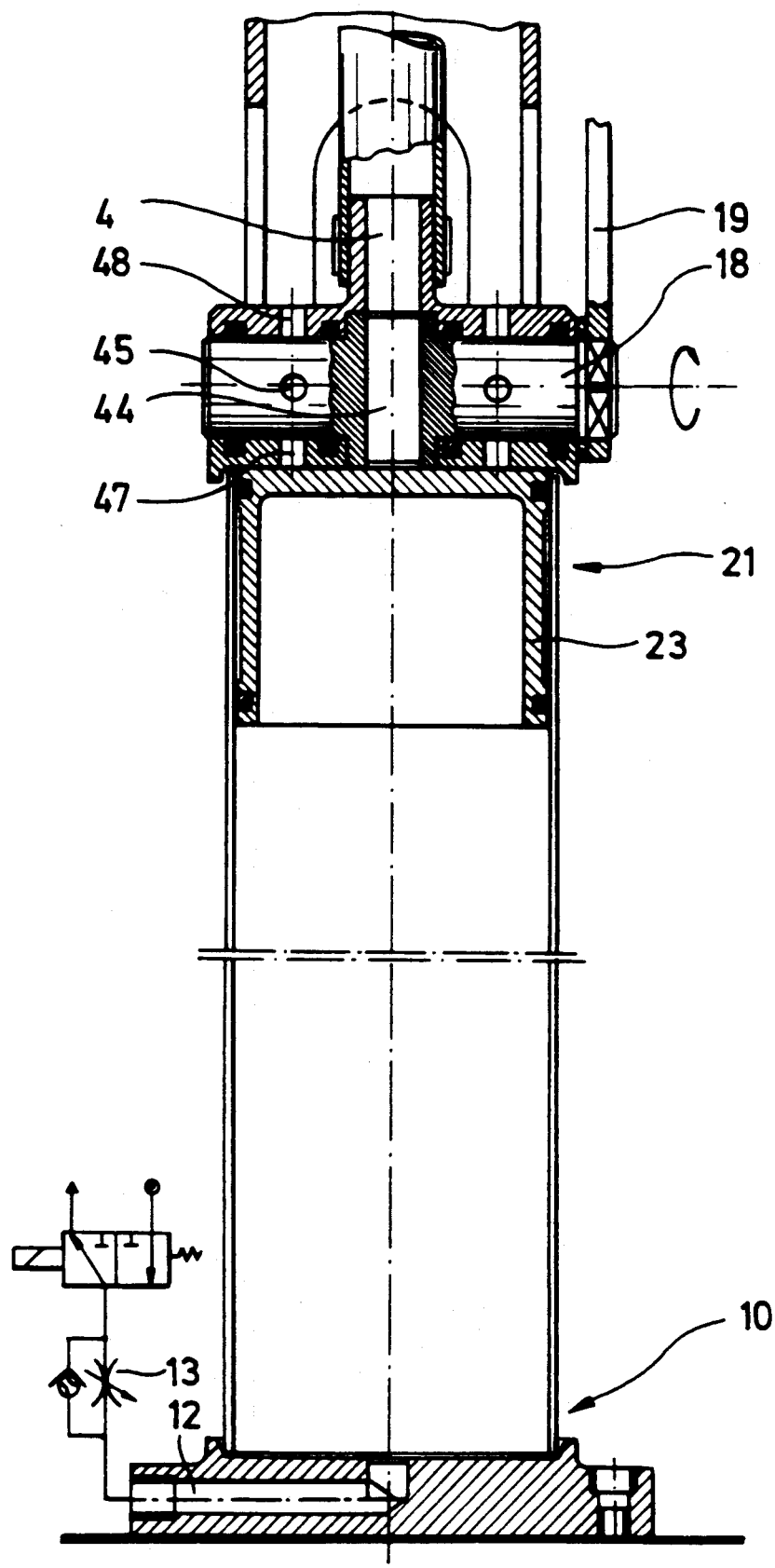

The incoming compressed air drives the piston 2 from the second end 10 of the jacket 5 in the direction of the first end 21 of the jacket 5, until it finally reaches its first end 21. As already indicated above, during the movement of the piston 23, air located in the interstice between the piston 23 and the first end 21 can escape in accordance with the arrows 27. When the piston 23 has reached the second end 21 of the jacket 5, it strikes against the closure surface 25 of the valve head 1 and is thus stopped. In this position, the filling position is reached, as also shown in FIG. 5. In the filling position, after the lever 19 is switched and thus the valve head 1 is switched to its filling position, the installation is ready to fill the jacket with sausage mixture. Here, after the lever 19 is moved, the air-evacuation valve 2 is closed and the filling valve 3 is opened, for which purpose the tap plug 18 is rotated to the corresponding position by operating the lever 19. Likewise the pilot valve 20 has been switched to its filling position, so that the feed and drain line 17 is no longer connected to the compressed-air line 16, but leads by way of the pilot valve 20 to the outside.

As shown in FIG. 1D, sausage mixture 28 is now pressed through the filling line 4 from a filling mechanism (not shown), such as a vacuum sausage filling machine, into the jacket 5, thus causing the piston 23 to be moved from the first end 21 of the jacket 5 to its second end 10. In this process, air is displaced from the space located between the piston 23 and the second end 10 of the jacket 5, through the receiving surface connection line 12 and the throttling port 13, by way of the feed and drain line 17 and the pilot valve 20, to the exterior. In this process the check valve 14 assumes its closed position. The throttling port 13 opposes a certain resistance to the piston 23, thus making it possible to fill the jacket 5 with sausage mixture 28 free of cavities.

When the piston 23 has reached the second end of the jacket 5, the lever 19 is operated and the tap plug 18 is rotated in such a way that the filling valve 3 is again closed and the air-evacuation 2 is opened, as shown in FIG. 1D. The plug 18 here can be rotated so far that the air-evacuation valve 2 resumes its open position and the valve head 1 is thus again ready for the insertion of a new jacket 5.

Then the valve head 1 is lifted, by which action the jacket 5 formerly clamped between the valve head 1 and the filling base 7 can be removed, as can be seen in FIG. 1E. The jacket 5 is then placed in a closing station, as shown in FIG. 1F. In this closing station, a closing head 29 applies a cover 30, whose surrounding edge 31 encloses the outer circumference of the jacket 5, and closes it with a cover closing surface 32 with the end face of the jacket 5 at its first end 21, in such a way that the closing surface 32 extends perpendicularly to the longitudinal axis 33 of the jacket 5.

At the second end of the jacket 5 the latter is closed by the piston 23, whose closing surface likewise extends, as already mentioned above, perpendicularly to the longitudinal axis 33 of the jacket 5.

The jacket 5 thus closed is placed in a cooking device 34, as shown in FIG. 1G, where it is exposed to hot or boiling water 35, whereupon the sausage mixture 28 coagulates into a relatively solid sausage mass. Alternatively, closed jacket 5 can be heated with air heated by steam heat exchangers, the air having been humidity saturated by the injection of steam. After a predetermined length of time, the jacket 5, and with it the now-finished sausage, is cooled.

After the cover 30 has been removed from the jacket 5, as a last process step this latter is placed on a cutting mechanism as shown in FIG. 2. The cutting mechanism presents a rotating cutting blade 36, which is set in rotation by means of an electric motor 37. The cutting blade 36 is disposed on a carriage 38 and is pivotable around an axis 39.

Moreover, the cutting mechanism is equipped with a feed mechanism 40, which presents a threaded spindle 41 and a rotatably driven spindle nut (not shown), which is driven by means of an additional electric motor 42.

Furthermore, the cutting mechanism is provided with fasteners 43 by means of which the jacket 5 can be fastened. The jacket 5 can be fastened to the cutting mechanism in such a way that the first end 21 of the jacket 5 is disposed in the immediate vicinity of the cutting blade 36, while the second end 10 of the jacket 5 is disposed in the immediate vicinity of the feed mechanism 40. In the feed position, the threaded spindle 41 engages with the piston 23 and conveys this latter from the second end 10 of the jacket 5 in the direction of the first end 21 of the jacket 5, in which process the sausage is pushed out of the jacket 5 in the direction of the cutting blade 36, and is cut in slices by the cutting blade 36 through suitable movements of same. In order to obtain slices of a suitable thickness, the feed rate and the movement of the cutting blade are governed dependent on one another, in which connection the feed may also proceed step by step.

The resulting casing-free sausage slices can be packaged directly, for example sealed in a clear plastic film.

After the entire sausage has been conveyed out of the jacket, the jacket 5 is released from the fastener 43, the piston 23 can be removed and the jacket 5 and piston 23 can be cleaned, after which they are ready to produce another sausage.

Figure 4:
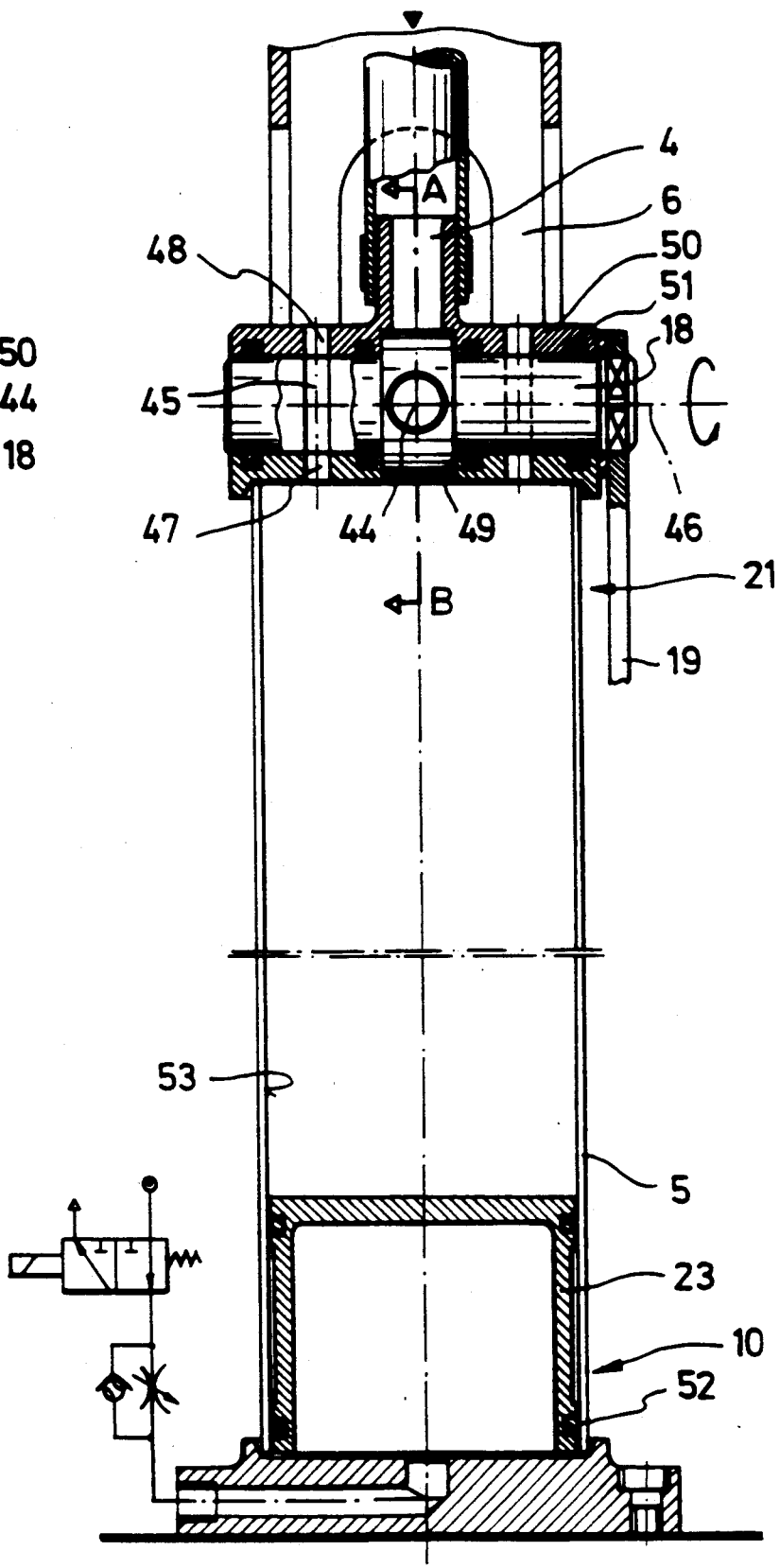
FIG. 4 is a side elevation with the central portion of the reusable casing broken away illustrating in expanded detail the construction of the upper and lower heads utilized with this invention, the traveling piston here being shown in the lower air evacuation position; and, FIG. 5 is a view similar to FIG. 4 illustrating the traveling piston in the upper position immediately prior to filling.

FIGS. 4 and 5 show in more detail, and in cross section, the design of the valve head 1, the jacket 5 with the piston 23 and the filling base 7. FIG. 4 shows the air-evacuation position, as has already been explained in connection with FIG. 1B, while FIG. 5 shows the filling position, as has already been shown in FIG. 1C.

As is explained below in association with FIG. 4, the air-evacuation valve 2 and the filling valve 3 are configured as a combined valve, with a radial sausage mixture filling hole 44 and a radial air-evacuation hole 45 being made in the tap plug 18, disposed offset from one another in the axial direction along the longitudinal axis 46 of the tap plug 18 and perpendicular to one another. The tap plug 18 is mounted rotatably in a housing 50 of the valve head 1, and the tap plug 18 is sealed off against the housing 50 by way of seals or washers 51, such as O rings. The tap plug 18 and the housing 50 are made of hardened metal, preferably KRUPP WIDIA steel. This permits the valve to sever any bits or pieces of sausage material which may get caught between the two valve elements when the valve is closed.

In the air-evacuation position shown in FIG. 4, the air-evacuation hole 45 is connected to a hole 47 opening to the interior of the jacket 5, and via a further hole 48 is connected to the annular space 6 which on the other hand leads to the outside. In the air-evacuation position, the tap plug 18 assumes an angled position such that the air-evacuation hole 45 is coaxially disposed with the holes 47 and 48, thus connecting the interior of the jacket 5 between the valve head 1 and the piston 23 directly outside to the environment by way of the annular space 6. The lever 19 in this position points downward in the direction of the second end 10 of the jacket 5. The sausage mixture filling hole 44 of the tap plug, since it extends offset 90° to the air-evacuation hole 45 of the tap plug, assumes a position such that the sausage mixture filling line 4 as well as the additional hole 49 opening to the interior of the jacket are closed.

At the start of the air-evacuation process the piston 23 is positioned at the second end 10 of the jacket 5 and is sealed by piston rings 52 against the cylindrical interior wall surface 53. As has already been explained in more detail in connection with FIG. 1A to 1C, compressed air is supplied through the receiving surface connection line 12, and drives the piston 23 from the second end 10 of the jacket 5 in the direction of its first end 21, and thus displaces the air located between the piston 23 and the valve head 1 through the holes 47, 45 and 48 and the annular space 6 to the outside, until the piston 23 stops against the valve head 1.

FIG. 5 shows the filling position in which the piston 23 is positioned at the second end 21 of the jacket 5. In the interior of the jacket 5, between the piston 23 and the second end 10 there is compressed air, which presses the piston 23 against the closing surface 25 of the valve head 1. In comparison to the air-evacuation position as shown in FIG. 4, the lever 19 in the filling position as shown in FIG. 5 is pivoted 90° upward, thus causing the tap plug 18 to assume a position such that the air-evacuation hole 45 is pivoted 90° with respect to holes 47 and 48, and thus these holes are closed off by the tap plug 18. The sausage mixture filling hole 44 is disposed coaxially to the filling line 4 and opens to the interior of the jacket 5. By conveying sausage mixture 28 into the interior of the jacket 5 the piston 23 is moved in the direction of the second end 10 of the jacket 5 and displaces air located between the piston 23 and the second end 10 of the jacket 5 through the receiving surface connection line 12 and the throttling port 13 to the outside, as has already been described in more detail in connection with FIGS. 1A and 1D.

What is claimed is:

1. A process for the manufacture of a sliceable, casing-free sausage having the steps of:
    providing a rigid, inflexible jacket having first and second ends;
    filing said rigid inflexible jacket through at least one of said ends with sausage mixture which undergoes coagulation upon cooking;
    closing said jacket at its first and second ends;
    heating for coagulation the sausage mixture through said jacket;
    cooling said sausage mixture within said jacket;
    opening the closed jacket at one of said ends;
    disposing said jacket at said open end to a slicing machine;
    ejecting said sausage from said jacket whereupon the finished sausage located in the jacket is pushed forward out of the jacket through its now-open end; and
    slicing said ejected finished sausage.

2. Process as claimed under claim 1, and wherein said ejecting and slicing steps include:
    slowly and incrementally pushing the sausage out of the jacket, through its open end, in the direction of a cutting blade; and
    slicing said sausage after a short incremental length relative to the jacket length has been pushed out of said jacket, whereby the sausage is incrementally conveyed directly to the cutting blade and sliced at each sausage increment.

3. The process of claim 1 and wherein said step of filling said jacket with sausage mixture includes the step of:
    pressing a piston back from the first end of the jacket to its second end against an air-displacement resistance of the piston.

4. Process of claim 1 and wherein the ejecting step is carried out by ejecting the sausage out of the jacket and into the cutting machine with a piston by moving said piston along the interior of the jacket.

5. The invention of claim 1 and wherein said closing step includes:
    closing said ends of the jacket with flat closures perpendicular to a longitudinal axis of the jacket, in such a way that the sausage inside the jacket has a cylindrical shape with an end face perpendicular to the longitudinal axis of the jacket.

6. A process for the manufacture of a sliceable, casing-free sausage having the steps of:
    providing a rigid, inflexible jacket having first and second ends;
    providing a piston that can be displaced longitudinally inside the jacket;
    placing said piston to the fist end of the jacket;
    filling said rigid inflexible jacket through said first end with sausage mixture which undergoes coagulation upon cooking, the piston being pressed back from the first end of the jacket to is second end by filling the jacket with sausage mixture;
    closing said jacket at its first end;
    heating for coagulating the sausage mixture through said jacket;
    cooling said sausage mixture within said jacket;
    opening the closed jacket at one of said ends;
    disposing said jacket at its now-open end to a slicing machine;

ejecting said sausage from said jacket whereupon the finished sausage located in the jacket is pushed forward out of the jacket through its now-open end; and slicing said ejected, finished sausage.

7. The process of claim 6 and wherein the step of placing said piston includes;
- placing said piston to the second end of said jacket; and
- conveying said piston from the second end of said jacket to the first end of said jacket by moving air in the jacket.

* * * * *